(12) United States Patent
Han et al.

(10) Patent No.: US 12,706,538 B2
(45) Date of Patent: Aug. 11, 2026

(54) MULTI-MODE POWER STAGE ARCHITECTURE FOR PULSE WIDTH MODULATION CONTROLLER

(71) Applicant: Advanced Micro Devices, Inc., Santa Clara, CA (US)

(72) Inventors: Wei Han, Shanghai (CN); Qi Qian, Shanghai (CN); Lili Chen, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 207 days.

(21) Appl. No.: 18/395,082

(22) Filed: Dec. 22, 2023

(65) Prior Publication Data

US 2025/0211093 A1 Jun. 26, 2025

(51) Int. Cl.
*H02M 3/158* (2006.01)

(52) U.S. Cl.
CPC .................................. *H02M 3/1584* (2013.01)

(58) Field of Classification Search
CPC .................................................. H02M 3/1584
See application file for complete search history.

(56) References Cited

U.S. PATENT DOCUMENTS

2012/0091977 A1* 4/2012 Carroll ................ H02M 3/1584 323/271
2020/0274448 A1* 8/2020 Jing ........................ H02J 1/102
2020/0366203 A1* 11/2020 Mei ..................... H02M 3/1584
2021/0028686 A1* 1/2021 Jiang ................... H02M 3/1584
2023/0336081 A1* 10/2023 Kao ........................ H02M 1/14

* cited by examiner

*Primary Examiner* — Harry R Behm
(74) *Attorney, Agent, or Firm* — Greenberg Traurig, LLP

(57) ABSTRACT

A driving power stage can receive a PWM signal from the PWM controller and output a PWM signal to a secondary power stage. The secondary power stage can be turned off by the driving power stage during a light-load mode. For a single-phase application, the driving power stage can turn off a switch, causing the power stage to work as a regular power stage. Various other methods and systems are also disclosed.

20 Claims, 7 Drawing Sheets

MULTI-MODE POWER STAGE ARCHITECTURE FOR PULSE WIDTH MODULATION CONTROLLER

BACKGROUND

Pulse Width Modulation (PWM) is a technique used to regulate the amount of power delivered to a device by varying the width of the pulses in a pulse sequence. A multi-phase voltage regulator can be used to generate power for a microprocessor.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
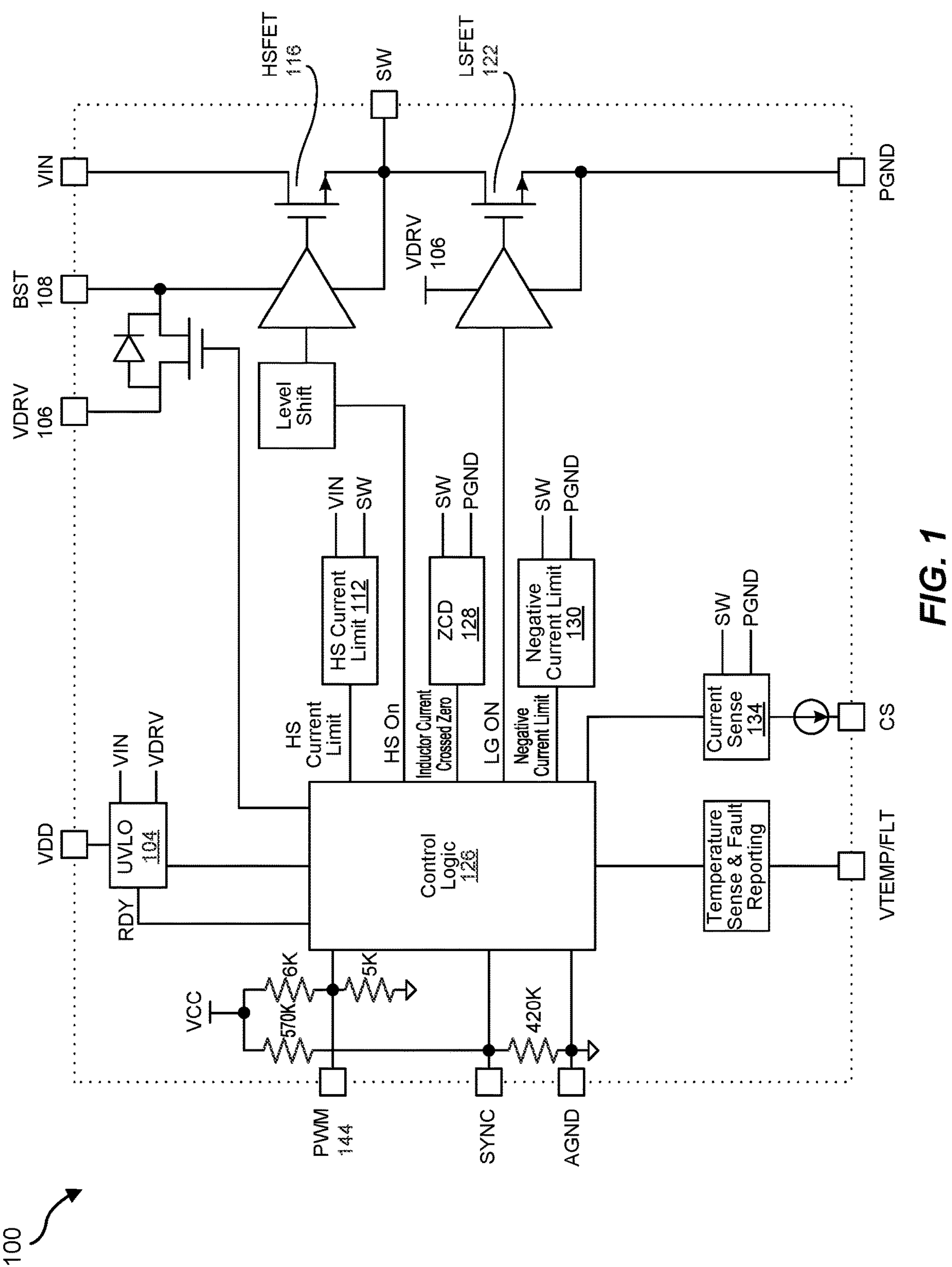
FIG. 1 is a diagram of an example power stage.

Throughout the drawings, identical reference characters and descriptions indicate similar, but not necessarily identical, elements. While the examples described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to a multi-mode power stage with a single PWM controller that can satisfy the electrical specifications of modern processors. In some examples, a multi-mode power stage can include an integrated PWM control unit and a switch control unit. A primary power stage can receive a PWM signal from the PWM controller and output a PWM signal to a secondary power stage. The secondary power stage can be turned off by the primary power stage during a light-load mode. For a single-phase application, the driving power stage can turn off a switch, causing the power stage to work as a regular power stage. An arbitrary number of secondary power stages can be chained together with the primary power stage, each secondary power stage providing a PWM signal to the next. In this manner, fewer PWM signals can drive more power stages to extend the number of phases. In addition, a single PWM controller can support a multi-phase application, reducing cost and controller pin count. Furthermore, this power stage design can reduce high frequency noise coupling.

Figure 2:
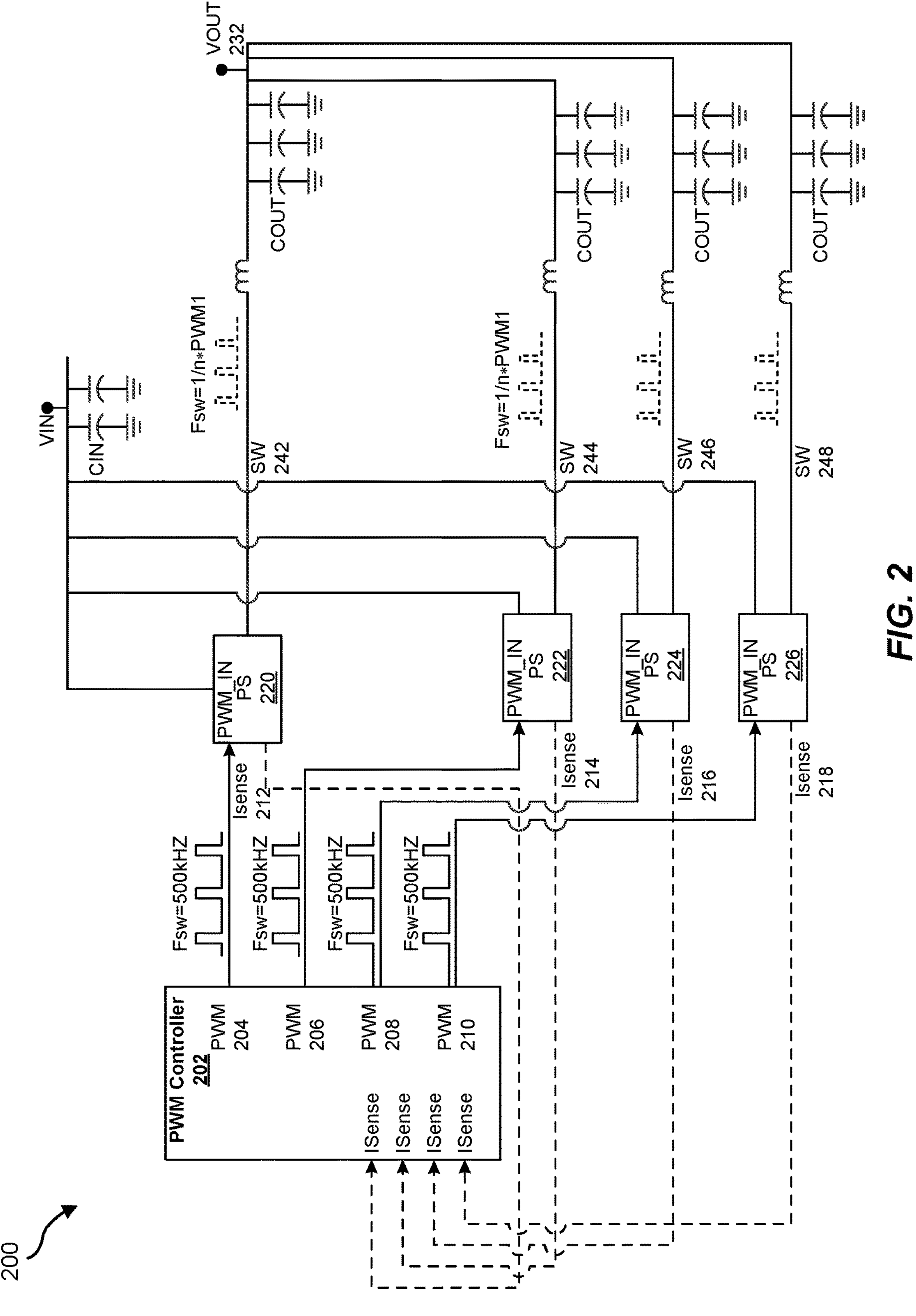
FIG. 2 is a diagram of an example four-phase system with four PWM signals and four power stages.

The following will provide, with reference to FIGS. 1-2, detailed descriptions of an example power stage and voltage regulator. Detailed descriptions of an example multi-mode power stage and a corresponding multiphase control system will be provided in connection with FIG. 3-7.

In some examples, a device includes a Pulse-Width Modulation (PWM) input interface and control circuitry. This control circuitry is configured to receive a PWM input signal from the input interface. In response to a first mode indicated by a mode indicator, it then generates a first and a second modified PWM signal. The device also has voltage regulation circuitry that adjusts a voltage to a target device based on the first modified PWM signal. There is a PWM output interface in the device, and a switching component which is responsible for sending the second modified PWM signal to this output interface when the first mode is indicated by the mode indicator.

In this device, the voltage regulation circuitry can include a driving circuitry. This driving circuitry is tasked with receiving the first modified PWM signal from the control circuitry. From there, it generates one or more driving signals based on this first modified signal. Additionally, there can be one or more switching elements within the regulation circuitry that manage the voltage to the target device in response to these driving signals. In some examples, these switching elements include both a high-side Metal-Oxide-Semiconductor Field-Effect Transistor (MOSFET) and a low-side MOSFET.

Generating the modified PWM signals can include the division of the PWM input signal. In some examples, the control circuitry can also transmit the unaltered PWM input signal to the voltage regulation circuitry when a second mode is indicated by the mode indicator. In situations where this second mode is indicated, the switching component is configured not to send a signal to the PWM output interface. The PWM output interface is configured to connect operationally to another instance of this device. The target device, in certain configurations, includes a microprocessor.

In some examples a system can include a PWM controller and a power stage. The power stage includes a PWM input interface that connects operationally to the PWM controller, and control circuitry. This control circuitry receives a PWM input signal from its interface and, in response to a first mode indicated by a mode indicator, produces a first and a second modified PWM signal. The system also includes voltage regulation circuitry that manages the voltage to a target device based on the first modified PWM signal, a PWM output interface, and a switching component. This switching component is responsible for sending the second modified PWM signal to the PWM output interface when the first mode is indicated.

In this system, the voltage regulation circuitry also includes a driving circuitry. This driving circuitry receives the first modified PWM signal from the control circuitry, and, based on that, produces one or more driving signals. The system then has one or more switching elements that adjust the voltage to the target device, depending on these driving signals. These switching elements consist of both a high-side MOSFET and a low-side MOSFET. Generating the modified PWM signals can include dividing the input signal. Further, the control circuitry can send an unmodified PWM input signal to the voltage regulation circuitry if a second mode is indicated by the mode indicator. Furthermore, in this second mode, the switching component doesn't transmit a signal to the output interface.

Additionally, the system can include multiple instances of the power stage. In this setup, the PWM output interface of each power stage instance is configured to operationally connect to a subsequent instance (with the exception of the last power stage instance in the series). This system can also include the target device, which can, in some configurations, be a microprocessor.

In some examples, a method involves control circuitry receiving a PWM input signal from its interface. In response to a first mode indicated by a mode indicator, the control circuitry produces a first and a second modified PWM signal. The first modified signal is then sent by the control circuitry to the voltage regulation circuitry, which adjusts the voltage to a target device based on this signal. Meanwhile, the second modified signal is sent by a switching component to the PWM output interface, again in response to the first mode. The driving circuitry within the voltage regulation circuitry receives the first modified signal from the control circuitry. Based on this, the driving circuitry produces one or more driving signals. The voltage to the target device is then regulated by one or more switching elements in response to these driving signals. The method of generating the modified PWM signals involves dividing the input signal.

FIG. 1 is a diagram of an example power stage 100. In some examples, power stage 100 can receive a PWM signal and subsequently regulate the voltage supplied to a device (such as a microprocessor).

In one example, power stage 100 can receive a PWM signal 144. PWM signal 144 can contribute to controlling the power to a device. In some examples, PWM signal 144 can be generated by varying the duty cycle of a digital pulse. PWM signal 144 can be generated by any of a variety of means, including, e.g., microcontrollers, digital signal processors, and/or dedicated integrated circuits. In some examples, PWM signal 144 can be generated by a PWM controller.

A control logic 126 can interpret the PWM signal 144 and determine the subsequent voltage output. For example, control logic 126 can decode PWM signal 144 and convert PWM signal 144 into one or more appropriate gate drive signals.

In some examples, an Under-Voltage Lock-Out (UVLO 104) can ensure that power stage 100 remains inactive under undesirable low-voltage conditions. Upon sensing appropriate voltage levels from the VDD, UVLO 104 can permit a voltage driver (VDRV 106) to function, safeguarding components from potential damage due to insufficient voltage.

In some examples, VDRV 106 can act as a driver, amplifying the signal from the control logic 126 to drive a high-side field-effect transistor (HSFET 116) and a low-side field-effect transistor (LSFET 122). The HSFET 116 and LSFET 122 operate complementarily to each other. When the HSFET 116 is on, the LSFET 122 is off and vice versa. This complementary operation, governed by the PWM signal, facilitates the regulation of the output voltage.

In some examples, a Bootstrap Circuit (BST 108) can the necessary voltage boost to drive the HSFET 116, especially when the system operates at higher voltages than the VDRV 106 can typically handle.

In some examples, the power stage 100 can employ both a high-side current limit (HS Current Limit 112) and a negative current limit (Negative Current Limit 130). These features can prevent excessive current from flowing through the HSFET 116 and LSFET 122, respectively, offering an added layer of protection to power stage 100.

In some examples, a Zero-Crossing Detector (ZCD 128) identifies the moment the PWM signal 144 transitions through zero voltage, allowing for optimized switching of the HSFET 116 and LSFET 122.

A current sense module 134 can provide feedback to a PWM controller that provides PWM signal 144, enabling the controller to adapt the PWM signal 144 in real-time in response to changing load conditions and/or potential overcurrent situations. This feedback mechanism can help to ensure stable voltage regulation under varying conditions.

FIG. 2 is a diagram of an example four-phase voltage regulator 200. In some examples, voltage regulator 200 can be designed for a high-current processor. As shown in FIG. 2, voltage regulator 200 uses a multi-phase controller, employing multiple power stages (e.g., multiple instances of power stage 100) to distribute current demand more effectively and enhance system efficiency.

Voltage regulator 200 can include a PWM controller 202. PWM controller 202 can generate four PWM signals: PWM signal 204, PWM signal 206, PWM signal 208, and PWM signal 210. These four PWM signals are transmitted to respective power stages: a power stage (PS) 220, a PS 222, a PS 224, and a PS 226, providing for a distributed, multi-phase power delivery system.

In scenarios demanding substantial current, such as during the operation of certain processors, a singular phase can be insufficient. Distributing the current requirement across multiple phases—here depicted as four—can ensure a more stable, efficient, and thermally balanced power delivery, minimizing potential voltage drops and promoting consistent performance.

Voltage regulator 200, in performance mode, can operate predominantly in Continuous Current Mode (CCM), where the inductor current remains continuous and does not drop to zero. This mode can be advantageous for situations demanding rapid response and consistent voltage output. However, to optimize efficiency during lighter loads and reduce switching losses, the regulator can transition to Discontinuous Current Mode (DCM). In DCM, the inductor current can intermittently drop to zero, resulting in reduced switching frequency and, consequently, enhanced efficiency.

Each of PS 220, 222, 224, and 226 can be equipped with current sensing mechanisms, resulting in current sensing signals Isense 212, 214, 216, and 218, respectively. These signals can provide real-time feedback on the current flowing through their respective power stages, allowing the PWM controller 202 to make necessary adjustments to the PWM signals, ensuring optimal performance and safeguarding against potential overcurrent situations.

Each of PS 220, 222, 224, and 226 can receive its distinct respective PWM signal 204, 206, 208, and 210 and process it to deliver regulated voltage to the load. The culmination of these power stages can result in an aggregate output voltage, VOUT 232, which can smoothed and stabilized using output capacitors (COUT). FIG. 2 shows illustrations of pulse patterns at switching nodes (SW) 242, 244, 246, and 248 corresponding to PWM signals 204, 206, 208, and 210.

Figure 3:
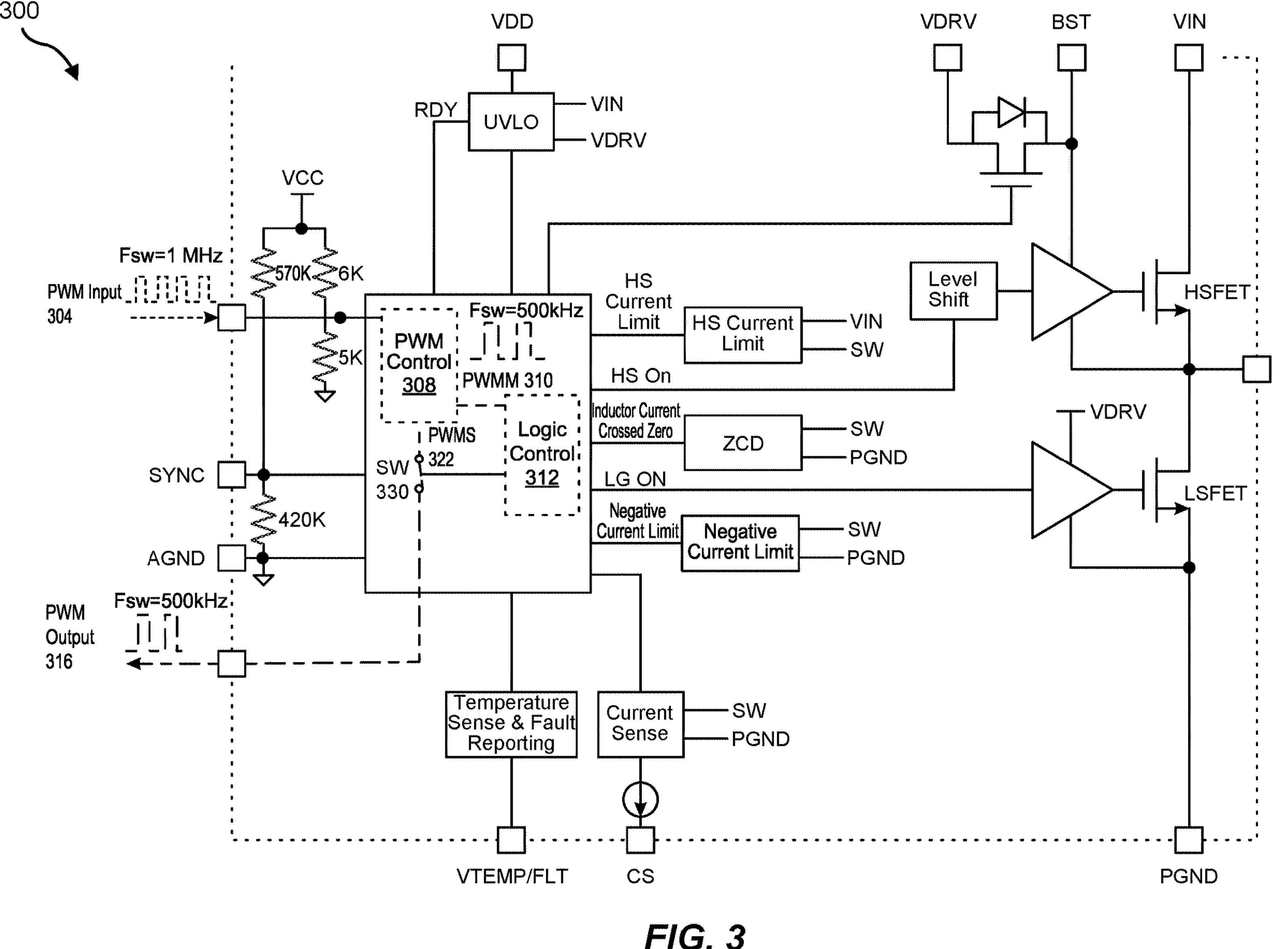
FIG. 3 is a diagram of an example power stage for an multi-mode power stage architecture.

FIG. 3 is a diagram of an example power stage 300 for a multi-mode power stage architecture. As shown in FIG. 3, power stage 300 can include the components and features of power stage 100 of FIG. 1. In addition, power stage 300 can include a PWM control 308 circuitry, a switch (SW) 330, and a PWM output 316 signal. As will be explained in greater detail below, the design of power stage 300 can allow a single PWM controller to effectively drive multiple power stages with a single original PWM signal.

Power stage 300 can accept a PWM signal via PWM input 304. PWM input 304 can encode information regarding a voltage level to provide to a target device.

PWM control 308 can split the singular PWM input 304 signal into two output signals. The first, PWMM 310, can act as the control for power stage 300. Meanwhile, the second, PWMS 322, can be destined for a subsequent power stage, thereby driving a separate phase. In some examples, PWM control 308 can simply transmit the PWM input 304 signal (i.e., for both PWMM 310 and PWMS 322) without dividing it. For example, as will be described in greater detail below, in some examples an instance of power stage 300 can be used as a primary power stage and one or more additional instances of power stage 300 can be used as a secondary power stage. In some examples, where power stage 300 is used as a primary power stage, PWM control 308 can split the PWM input 304 signal; and where power stage 300 is used as a secondary power stage, PWM control 308 transmit the PWM input 304 signal without dividing the signal.

A logic control module 312 can receive and interpret the PWMM 310 signal and determine the subsequent voltage output. For example, logic control module 312 can decode the PWMM 310 signal and convert the PWMM 310 signal into one or more appropriate gate drive signals.

In some examples, power stage 300 can enter a single-phase and/or light-load mode. In these examples, power stage 300 can cut the signal to subsequent power stages to optimize energy consumption. For single-phase applications, power stage 300 can turn off SW 330, thereby reverting to the behavior of power stage 100 of FIG. 1. In these cases, a PWM output 316 signal is inactive. In a multi-phase and/or high-power mode, power stage 300 can turn on SW 330, thereby providing the PWMS 322 signal to the PWM output 316 signal, and driving subsequent power stages (e.g., subsequent instances of power stage 300).

Figure 4:
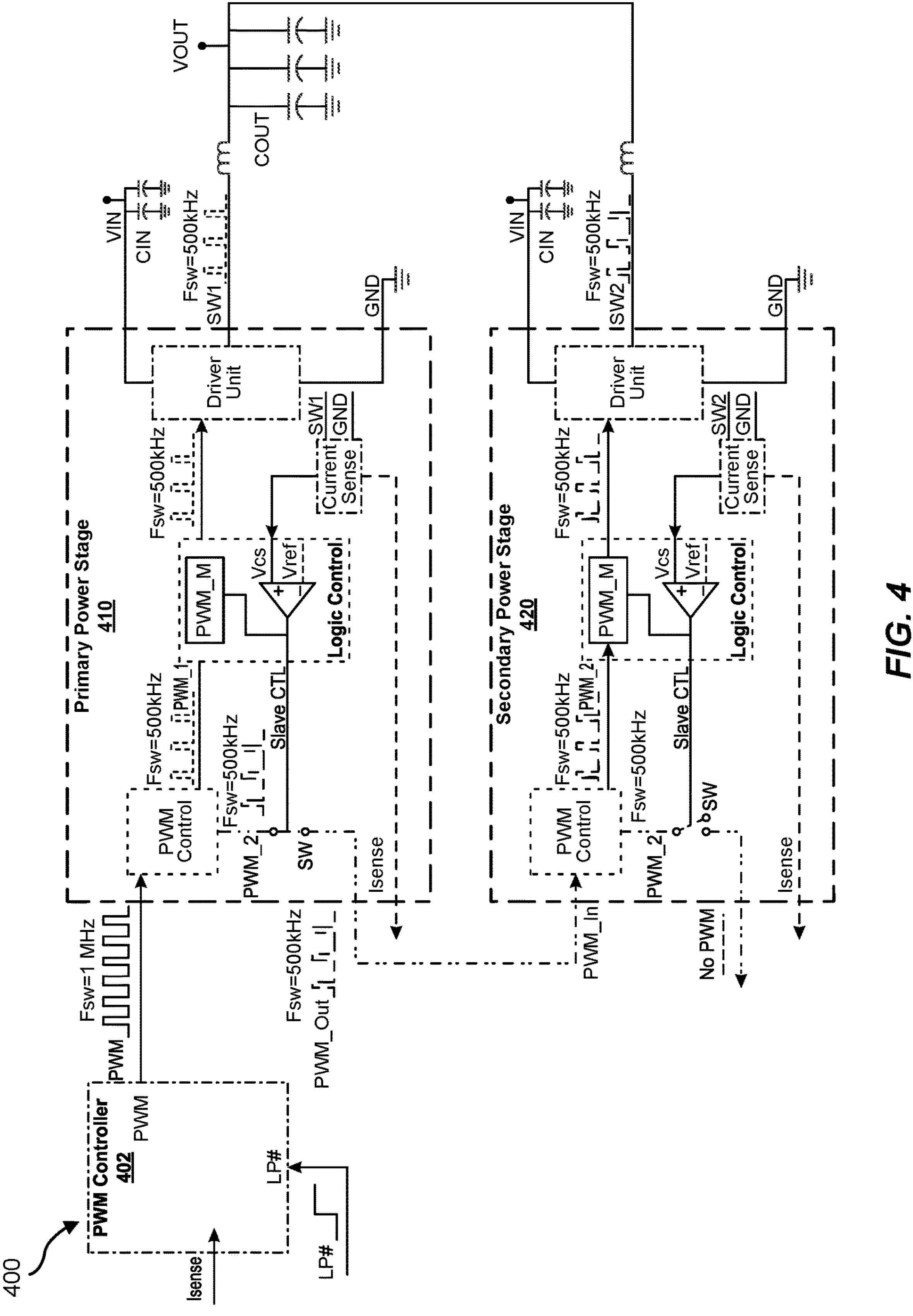
FIG. 4 is a diagram of an example two-phase system with a single PWM controller and two multi-mode power stages.

FIG. 4 is a diagram of an example system 400 with a single PWM controller and two multi-mode power stages. As shown in FIG. 4, system 400 can include a PWM controller 402 that provides a single PWM signal to a primary power stage 410. In some examples, PWM controller 402 also receives a signal indicating whether a target device of system 400 (e.g., a microprocessor) is in a low power mode. If so, system 400 can operate in a single-phase mode. Otherwise, system 400 can operate in a two-phase mode.

In some examples, primary power stage 410 can be an instance of power stage 300 in FIG. 3. When in a two-phase mode, primary power stage 410 can divide the PWM signal from PWM controller 402 such that a portion of the divided signal is used by primary power stage 410 to drive voltage to VOUT and a portion of the divided signal is transmitted to a secondary power stage 420. Secondary power stage 420 can then use its portion of the divided signal to drive voltage to VOUT.

Figure 5:
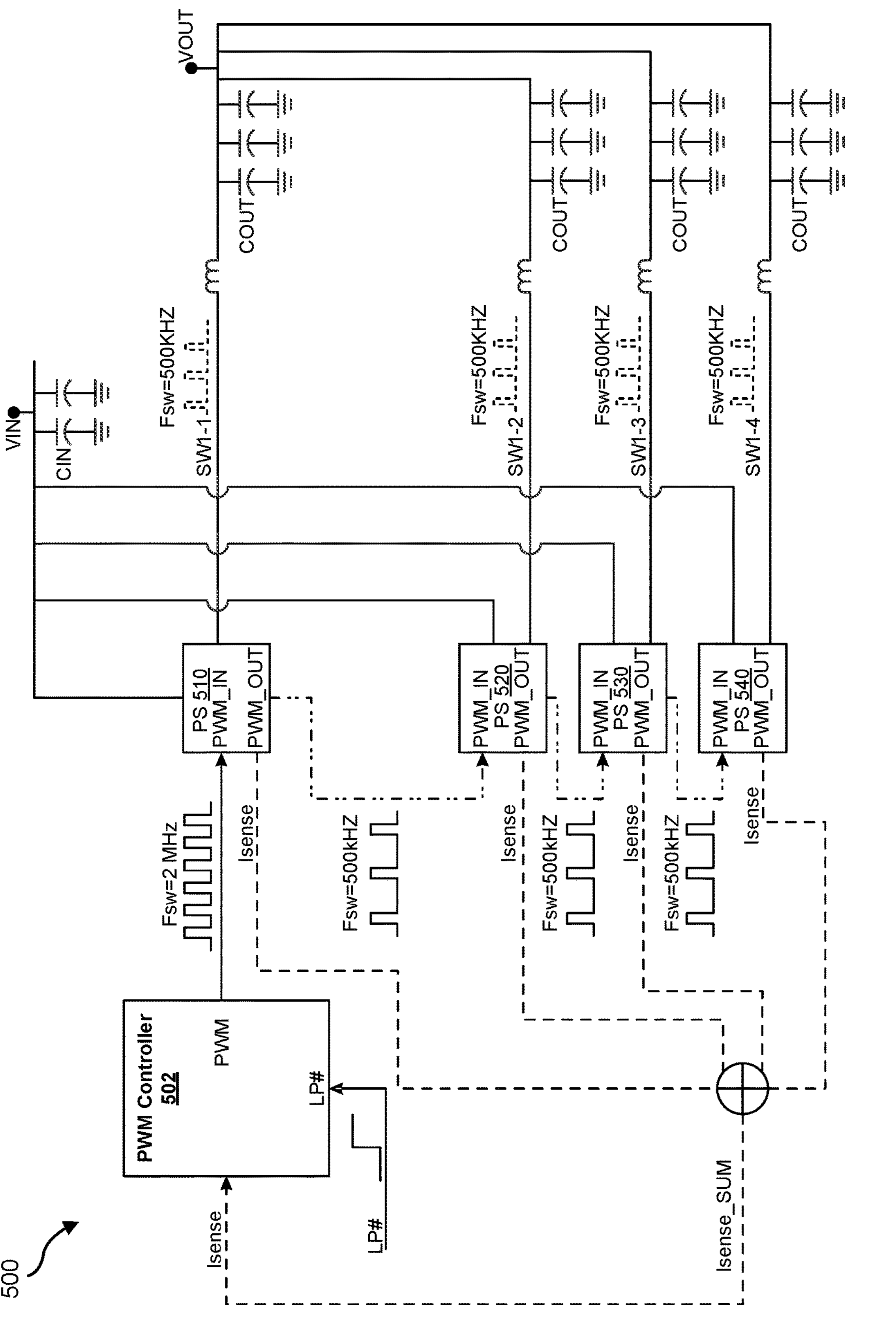
FIG. 5 is a diagram of an example four-phase system with a single PWM controller and four multi-mode power stages.

FIG. 5 is a diagram of an example four-phase system 500 with a single PWM controller and four multi-mode power stages. As shown in FIG. 5, system 500 can include a PWM controller 402 that provides a single PWM signal to a primary power stage PS 510. In some examples, PWM controller 502 also receives a signal indicating whether a target device of system 500 (e.g., a microprocessor) is in a low power mode. If so, system 500 can operate in a single-phase mode. Otherwise, system 500 can operate in a multi-phase mode.

In some examples, PS 510 can be an instance of power stage 300 in FIG. 3. When in a multi-phase mode, PS 510 can divide the PWM signal from PWM controller 502 such that a portion of the divided signal is used by primary power stage PS 510 to drive voltage to VOUT and a portion of the divided signal is transmitted to a PS 520. Similarly, PS 520 can use its input PWM signal to generate voltage to VOUT and also to provide a PWM signal to PS 530. PS 530 can use its input PWM signal to drive voltage to VOUT and also to provide a PWM signal to PS 540. As shown in FIG. 5, in one example, the original PWM signal from PWM controller 502 can have a switching frequency (Fsw) of 2 MHz. PS 510 can divide the original PWM signal to 500 KHz per power stage (e.g., 2000 KHz divided by four, given the four power stages, resulting in 500 KHz).

Figure 6:
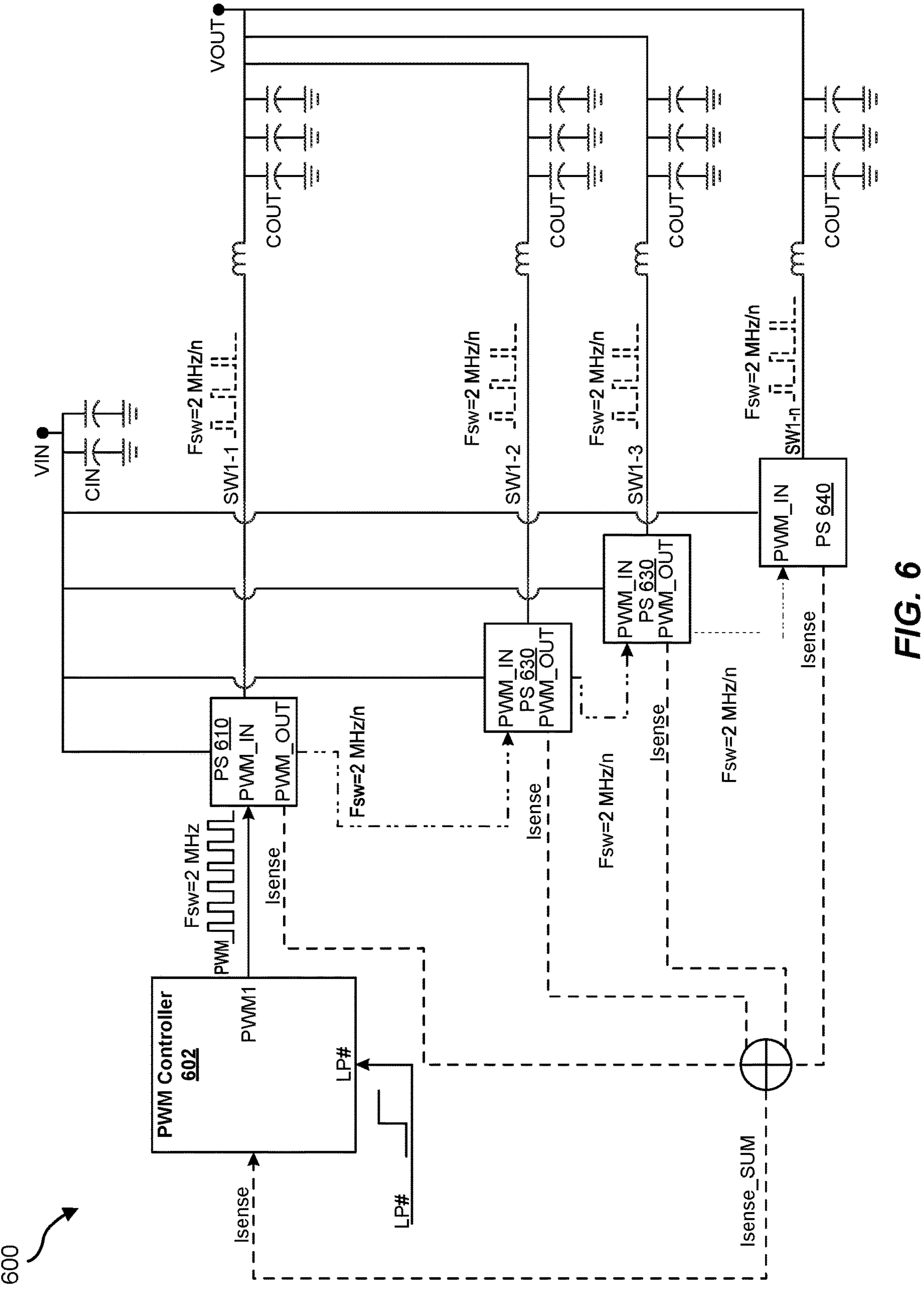
FIG. 6 is a diagram of an example N-phase system with a single PWM controller and N multi-mode power stages in a high-power mode.

FIG. 6 is a diagram of an example N-phase system 600 with a single PWM controller and N multi-mode power stages in a high-power mode. As shown in FIG. 6, system 600 can include a PWM controller 602 that provides a single PWM signal to a primary power stage PS 610. In some examples, PWM controller 602 also receives a signal indicating whether a target device of system 600 (e.g., a microprocessor) is in a low power mode. If so, system 600 can operate in a single-phase mode. Otherwise, system 600 can operate in a multi-phase mode. As shown in FIG. 6, in one example, the original PWM signal from PWM controller 602 can have a switching frequency (Fsw) of 2 MHz. PS 610 can divide the original PWM signal to (2 MHz/n) per power stage (e.g., 2000 KHz divided by n, given the n power stages, resulting in (2 MHz/n)).

In some examples, PS 610 can be an instance of power stage 300 in FIG. 3. When in a multi-phase mode, PS 510 can divide the PWM signal from PWM controller 602 such that a portion of the divided signal is used by primary power stage PS 610 to drive voltage to VOUT and a portion of the divided signal is transmitted to a PS 620. Once PS 610, as the primary power stage, has determined the switching frequency for each power stage, the secondary power stages, including PS 620, PS 630, PS 640, and any intermediate power stages between PS 630 and PS 640, can use the signal set by PS 610 to PWM_OUT, resulting in an equal distribution of switching frequency across the power stages in system 600.

Figure 7:
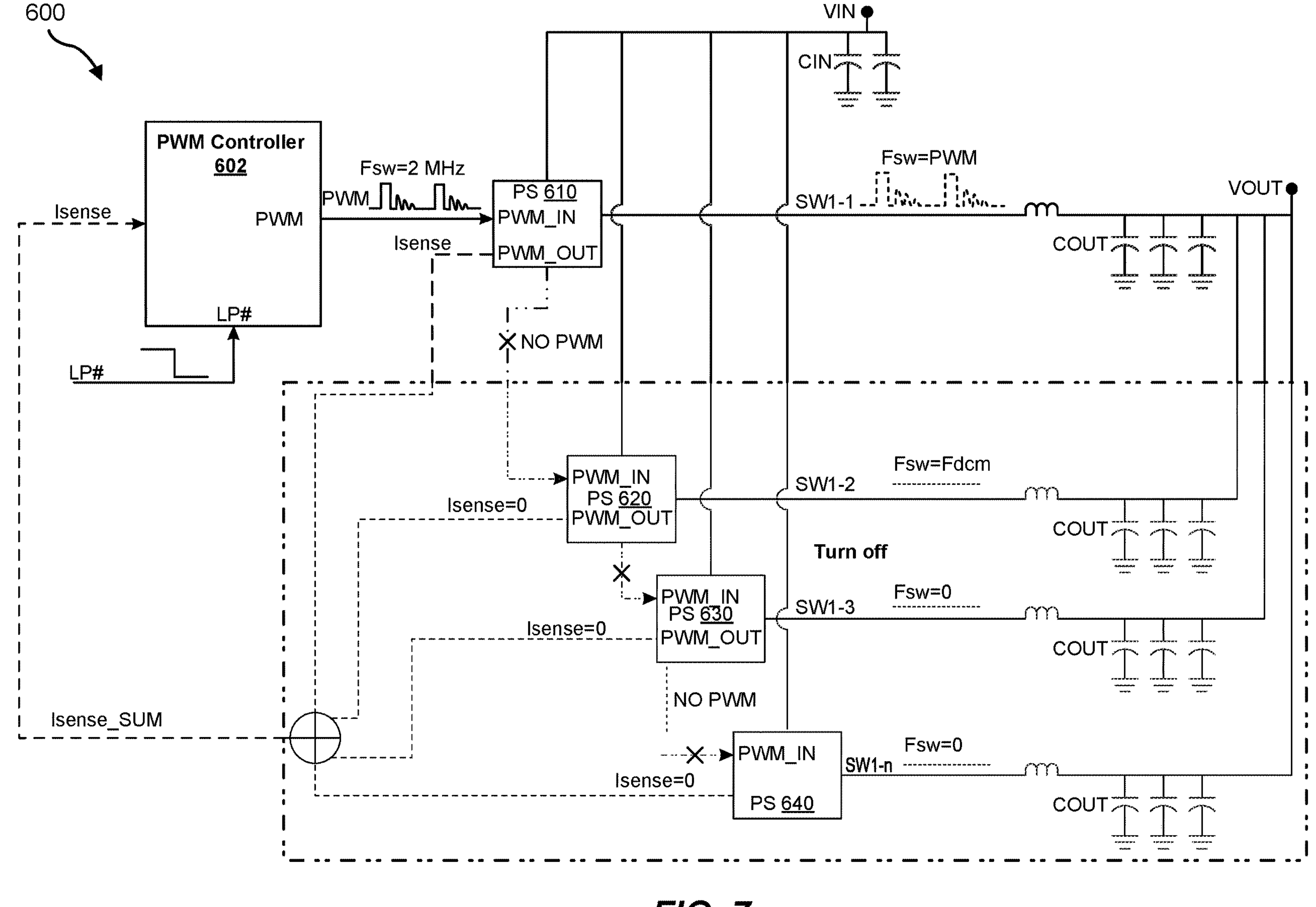
FIG. 7 is a diagram of the system of FIG. 6 in a light-power mode.

FIG. 7 is a diagram of system 600 in a low-power mode. As shown in FIG. 7, PWM controller 602 receives a signal indicating a low-power mode. Accordingly, PWM controller 602 provides a lower-frequency PWM signal (i.e., that will not be divided among power stages) to PS 610. PS 610 does not provide any PWM signal to PS 620. Accordingly, PS 630, PS 640, and any intermediate power stages do not receive a PWM signal and do not drive voltage to VOUT.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:

a primary power stage circuit comprising:

a Pulse-Width Modulation (PWM) input interface;

a control circuitry configured to:

receive a PWM input signal from the PWM input interface; and generate, in response to a first mode indicated by a mode indicator, a first modified PWM signal and a second modified PWM signal by dividing the PWM input signal;

a voltage regulation circuitry that regulates a voltage to a target device based on the first modified PWM signal;

a PWM output interface; and a switching component configured to transmit the second modified PWM signal to the PWM output interface in response to the first mode indicated by the mode indicator; and a plurality of secondary power stage circuits, wherein at least a first one of the plurality of secondary power stage circuits is configured to receive the second modified PWM signal from the primary power stage circuit and output the second modified PWM signal to at least a second one of the plurality of secondary power stage circuits.

2. The device of claim 1, wherein the voltage regulation circuitry comprises:

a driving circuitry configured to:

receive the first modified PWM signal from the control circuitry; and generate, based on the first modified PWM signal, one or more driving signals; and one or more switching elements that regulate the voltage to the target device in response to the one or more driving signals.

3. The device of claim 2, wherein the one or more switching elements comprise:

a high-side Metal-Oxide-Semiconductor Field-Effect Transistor (MOSFET); and a low-side MOSFET.

4. The device of claim 1, wherein the control circuitry is further configured to transmit the PWM input signal unmodified to the voltage regulation circuitry in response to a second mode indicated by the mode indicator.

5. The device of claim 4, wherein the switching component is further configured to not transmit a signal to the PWM output interface in response to the second mode indicated by the mode indicator.

6. The device of claim 1, wherein the PWM output interface is configured to operatively connect to an additional instance of the device.

7. The device of claim 1, wherein the target device comprises a microprocessor.

8. A system comprising:

a primary power stage circuit comprising:

a Pulse-Width Modulation (PWM) controller;

a power stage comprising:

a PWM input interface operatively coupled to the PWM controller;

a control circuitry configured to:

receive a PWM input signal from the PWM input interface; and generate, in response to a first mode indicated by a mode indicator, a first modified PWM signal and a second modified PWM signal by dividing the PWM input signal;

a voltage regulation circuitry that regulates a voltage to a target device based on the first modified PWM signal;

a PWM output interface; and a switching component configured to transmit the second modified PWM signal to the PWM output interface in response to the first mode indicated by the mode indicator; and a plurality of secondary power stage circuits, wherein at least a first one of the plurality of secondary power stage circuits is configured to receive the second modified PWM signal from the primary power stage circuit and output the second modified PWM signal to at least a second one of the plurality of secondary power stage circuits.

9. The system of claim 8, wherein the voltage regulation circuitry comprises:

a driving circuitry configured to:

receive the first modified PWM signal from the control circuitry; and generate, based on the first modified PWM signal, one or more driving signals; and one or more switching elements that regulate the voltage to the target device in response to the one or more driving signals.

10. The system of claim 9, wherein the one or more switching elements comprise:

a high-side Metal-Oxide-Semiconductor Field-Effect Transistor (MOSFET); and a low-side MOSFET.

11. The system of claim 8, wherein the control circuitry is further configured to transmit the PWM input signal unmodified to the voltage regulation circuitry in response to a second mode indicated by the mode indicator.

12. The system of claim 11, wherein the switching component is further configured to not transmit a signal to the PWM output interface in response to the second mode indicated by the mode indicator.

13. The system of claim 8, further comprising a plurality of instances of the power stage, wherein the PWM output interface of each instance of the power stage is configured to operatively connect to a subsequent instance of the power stage, excepting a final instance of the power stage.

14. The system of claim 8, further comprising the target device.

15. The system of claim 14, wherein the target device comprises a microprocessor.

16. A method comprising:

receiving, by a control circuitry of a primary power stage circuit, a Pulse-Width Modulation (PWM) input signal from a PWM input interface;

generating, by the control circuitry, in response to a first mode indicated by a mode indicator, a first modified PWM signal and a second modified PWM signal by dividing the PWM input signal;

transmitting, by the control circuitry, the first modified PWM signal to a voltage regulation circuitry that regulates a voltage to a target device based on the first modified PWM signal;

transmitting, by a switching component, the second modified PWM signal to a PWM output interface of a first one of a plurality of secondary power stage circuits in response to the first mode indicated by the mode indicator; and transmitting, by the first one of the plurality of secondary power stage circuits to a second one of the plurality of secondary power stage circuits, the second modified PWM signal in response to the first mode indicated by the mode indicator.

17. The method of claim 16, further comprising:

receiving, by a driving circuitry within the voltage regulation circuitry, the first modified PWM signal from the control circuitry;

generating, by the driving circuitry, based on the first modified PWM signal, one or more driving signals; and regulating, by one or more switching elements, the voltage to the target device in response to the one or more driving signals.

18. The method of claim 16, further comprising transmitting, by the control circuitry, the PWM input signal unmodified to the voltage regulation circuitry in response to a second mode indicated by the mode indicator.

19. The method of claim 18, wherein the switching component is further configured to not transmit a signal to the PWM output interface in response to the second mode indicated by the mode indicator.

20. The method of claim 16, wherein the target device comprises a microprocessor.

* * * * *